Patented Aug. 26, 1924.

1,505,990

UNITED STATES PATENT OFFICE.

THEODORE A. WILLARD, OF CLEVELAND HEIGHTS, OHIO, ASSIGNOR TO WILLARD STORAGE BATTERY COMPANY, OF CLEVELAND, OHIO, A CORPORATION OF WEST VIRGINIA.

PASTE FOR STORAGE BATTERIES.

No Drawing. Application filed February 4, 1920, Serial No. 356,287. Renewed December 26, 1923.

*To all whom it may concern:*

Be it known that I, THEODORE A. WILLARD, a citizen of the United States, residing at Cleveland Heights, in the county of Cuyahoga and State of Ohio, have invented a certain new and useful Improvement in Paste for Storage Batteries, of which the following is a full, clear, and exact description.

The present invention relates to storage battery paste, and has for its object to provide a paste including one or more ingredients which are mixed with the lead oxide or oxides and which will improve the operation or performance of the battery. The improved paste and the preferred way of preparing it are explained below.

In accordance with the present invention lignin, or a substance containing lignin is mixed with the regular oxide or oxides of lead. This ingredient will be hereinafter referred to as lignin, by which is meant either an artificial or a natural product consisting of, or containing lignin. This ingredient may be, and preferably is mixed with the oxides forming paste for both the positive and negative plates, or for certain purposes simply with the paste for negative plates.

The lignin which I mix with the active material is preferably derived from wood or certain other vegetable materials such as hemp, jute, straw, flax and the like. I may, if desired, use lignite, which is a natural product, and when ground or powdered to the right degree of fineness is mixed with the oxide or oxides of lead, i. e. litharge or red lead in precisely the same way as when the artificial product or ingredient is employed.

Preferably wood is employed as the material from which the lignin is derived. Oak wood has proven to be very effective, though other woods can be utilized, as well as other vegetable substances such as those already mentioned, including hemp, jute, etc.

To produce the lignin, wood (or other suitable vegetable material) is first finely ground, and is then treated with a strong sulphuric acid solution. Preferably a seventy-two per cent solution of sulphuric acid is utilized, and the ground wood or other vegetable material is mixed with the sulpluric acid for about four hours at normal temperature.

Then the ground material is washed and filtered. Then the part remaining in the filter is dried, the drying placing it in a condition for mixture with the regular oxide or oxides of lead. The product obtained by this treatment is the lignin previously mentioned, this product now being relieved by the acid treatment and subsequent washing of all or the greater portion of the cellulose and acids that the wood or other vegetable material originally contained. By the acid treatment and washing there are therefore eliminated the ingredients which in the use of a battery are harmful to the latter, and which particularly attack lead. Though the cellulose and the harmful ingredients are removed, nevertheless beneficial portion or portions remain, the fine particles retaining their original shape or porous structure, this being, I believe, an important feature or characteristic of the ingredient for use with the lead oxides.

Then a small percentage of the lignin by weight is thoroughly and uniformly mixed with the litharge to form the improved paste for the negative plates, or with both red lead and litharge to form the improved paste for the positive plates.

This finely divided lignin is mixed with the oxide or oxides of lead, preferably in the proportion of six-tenths of one per cent by weight, though it may be desirable to increase or decrease the proportion of lignin, and I therefore do not wish to be confined to the proportion stated. This produces the improved paste ready to be applied to the storage battery grids.

In carrying out this invention the wood or other vegetable matter which is ground to form the lignin, and the lignite if it is used instead of the lignin, are preferably ground to a fineness such that particles will pass through what is known as a sixty mesh screen though, of course, I do not wish to be confined to this degree of fineness.

The use of my improved paste formed as above described, produces a battery which gives very good results and which has greater capacity than the ordinary batteries using the oxides of lead alone. I do not know precisely to what this beneficial result is attributable. It may be due to the porosity imparted to the paste by the lignin, but it is not unlikely that a substance or ingredient in the lignin acts as a catylytic agent.

Having described my invention, I claim:

1. A paste for storage batteries comprising active material having lignin incorporated therein.

2. A paste for storage batteries comprising active material having a lignin containing product incorporated therein.

3. A paste for storage batteries comprising active material in which is incorporated a vegetable substance free of free cellulose.

4. A paste for storage battery plates comprising active material in which has been incorporated finely divided lignin.

5. A paste for storage batteries comprising active material in which there is incorporated and mixed therewith a small percentage of lignin in a finely divided state.

In testimony whereof, I hereunto affix my signature.

THEODORE A. WILLARD.